United States Patent
Yang et al.

(10) Patent No.: US 8,072,554 B2
(45) Date of Patent: Dec. 6, 2011

(54) TRANSFLECTIVE LIQUID CRYSTAL DISPLAY PANEL

(75) Inventors: Tun-Chun Yang, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 680 days.

(21) Appl. No.: 12/189,810

(22) Filed: Aug. 12, 2008

(65) Prior Publication Data

US 2009/0115924 A1 May 7, 2009

(30) Foreign Application Priority Data

Nov. 6, 2007 (TW) .............................. 96141859 A

(51) Int. Cl.
 *G02F 1/1343* (2006.01)
 *G02F 1/1335* (2006.01)
(52) U.S. Cl. ........................... 349/38; 349/114; 349/138
(58) Field of Classification Search .................. 349/114, 349/138, 38, 141, 106, 139, 43
 See application file for complete search history.

(56) References Cited

U.S. PATENT DOCUMENTS

| 6,400,424 | B1 | 6/2002 | Kim | |
|---|---|---|---|---|
| 7,561,239 | B2* | 7/2009 | Fujita | 349/142 |
| 7,593,078 | B2* | 9/2009 | Ochiai et al. | 349/114 |
| 7,643,115 | B2* | 1/2010 | Sato et al. | 349/114 |
| 2002/0149728 | A1 | 10/2002 | Ogishima | |

FOREIGN PATENT DOCUMENTS

| CN | 101017301 A | 8/2007 |
|---|---|---|
| TW | 200528887 | 9/2005 |
| TW | 200705021 | 2/2007 |

* cited by examiner

*Primary Examiner* — Thoi V Duong
(74) *Attorney, Agent, or Firm* — Winston Hsu; Scott Margo

(57) ABSTRACT

A transflective liquid crystal display panel is disclosed. The transflective liquid crystal display panel includes an array substrate and a storage capacitor disposed on the array substrate. The array substrate includes a transmitting region, a capacitor region, and a transistor region. The storage capacitor preferably includes a first transparent conductive layer covering the transmitting region and the capacitor region, a dielectric layer disposed on the first transparent conductive layer, and a second transparent conductive layer disposed on the dielectric layer. A planarizing layer is disposed on the second transparent conductive layer, and a reflective layer is then disposed on the planarizing layer of the transistor region.

20 Claims, 16 Drawing Sheets

TRANSFLECTIVE LIQUID CRYSTAL DISPLAY PANEL

BACKGROUND OF THE INVENTION

1. Field of the Invention

The invention relates to a liquid crystal display panel, and more particularly, to a transflective liquid crystal display panel.

2. Description of the Prior Art

By having characteristics of lightness, less radiation, and low power consumption, liquid crystal displays have gradually replaced conventional cathode ray tubes and become the dominant product in the display market. Typically, a liquid crystal display includes an array substrate, a color filter substrate, and a liquid crystal layer filled between the array substrate and the color filter substrate. The array substrate includes a plurality of pixels arranged in the manner of a matrix, in which each of the pixels is defined by a plurality of scan lines arranged horizontally and a plurality of data lines arranged vertically. Thin film transistors are used as switch elements for each pixel, and pixel electrodes are used to drive liquid crystals to adjust brightness of the pixels. Blue, green, and red color filters disposed on the color filter substrate are utilized to generate lights of different colors, thereby producing high quality color images. Depending on their source of lights, liquid crystal display panels are categorized into transmitting liquid crystal display panels, reflective liquid crystal display panels, and transflective liquid crystal display panels.

Referring to FIG. 1, FIG. 1 illustrates a schematic view of a transflective liquid crystal display panel according to the prior art. As shown in FIG. 1, the conventional transflective liquid crystal display panel includes at least a pixel 12 and a plurality of scan lines 20 and data lines 22 surrounding the pixel 12. The pixel 12 also includes a transmitting region 14, a capacitor region 16, and a transistor region 18, in which capacitors and thin film transistors are disposed in the capacitor region 16 and the transistor region 18 respectively.

It should be noted as the specification (such as contrast, viewing angle, response time, and NTSC values) of liquid crystal display advances, numerous metal structures are fabricated into the transistor and capacitor region of the display. This design not only raises the complexity of the display panel but also reduces its aperture ratio and results in lowered transmitting rate. Due to the nature of having both transmitting and reflecting mode, the reduction of the pixel area of a transflective liquid crystal display becomes much more difficult as the resolution of the display increases. This increases the proportion of non-transparent structures in the pixel region and affects the optical performance of the display panel significantly. If the aperture ratio of the display panel is increased by reducing the number of storage capacitors, problem such as electrical instability will result. Consequently, how to effectively increase the aperture ratio of a liquid crystal display pane has become an important task.

SUMMARY OF THE INVENTION

It is an objective of the present invention to provide a liquid crystal display panel to solve the aforementioned problems.

A liquid crystal display panel is disclosed. The liquid crystal display panel includes: an array substrate having a transmitting region, a capacitor region, and a transistor region; a storage capacitor disposed on the array substrate; an opposing substrate disposed opposite to the array substrate; and a liquid crystal layer disposed between the array substrate and the opposing substrate. The storage capacitor disposed on the array substrate includes a first transparent conductive layer disposed on the transmitting region and capacitor region of the array substrate, a dielectric layer disposed on the first transparent conductive layer and the array substrate, a second transparent conductive layer disposed on the dielectric layer; and a reflective layer disposed on a portion of the second transparent conductive layer.

An array substrate for a liquid crystal display is disclosed. The array substrate includes a substrate having a plurality of pixel regions, in which each of the pixel regions comprises a transmitting region, a capacitor region, and a transistor region. A thin film transistor is disposed on the transistor region of the substrate. A first dielectric layer is disposed on the substrate. A first patterned transparent conductive layer is disposed on the first dielectric layer of the capacitor region. A second dielectric layer is disposed on the first patterned transparent conductive layer and the substrate. A second patterned transparent conductive layer is disposed on the second dielectric layer of the transistor region, the capacitor region, and the transmitting region and electrically connected to the thin film transistor. A patterned reflective electrode is disposed on a portion of the second patterned transparent conductive layer of the transistor region.

A pixel structure for a liquid crystal display is disclosed. The pixel structure having a transmitting region, a capacitor region, and a transistor region is disposed on an array substrate. A thin film transistor is disposed on the transistor region of the pixel structure. A pixel electrode is disposed on the transmitting region and electrically connected to the thin film transistor. A transparent storage capacitor is disposed on the capacitor region comprises a first transparent conductive layer disposed on the capacitor region. A transparent dielectric layer disposed on the first transparent conductive layer. A second transparent conductive layer disposed on the transparent dielectric layer and electrically connected to the thin film transistor. A reflective electrode disposed on the transistor region and electrically connected to the thin film transistor.

A liquid crystal display panel is disclosed. The liquid crystal display panel includes a top substrate and a bottom substrate disposed opposite to the top substrate. Wherein, the bottom substrate comprises a transmitting region, a capacitor region, and a transistor region. A plurality of wires disposed on the bottom substrate. A liquid crystal layer disposed between the top substrate and the bottom substrate. A plurality of pixels electrically connected to the wires. Each of the pixels includes a thin film transistor disposed on the transistor region of the substrate. A first dielectric layer disposed on the substrate. A first patterned transparent conductive layer disposed on the first dielectric layer of the capacitor region. A second dielectric layer disposed on the first patterned transparent conductive layer and the substrate. A second patterned transparent conductive layer disposed on the second dielectric layer of the transistor region, the capacitor region, and the transmitting region and electrically connected to the thin film transistor. A patterned reflective electrode disposed on a portion of the second patterned transparent conductive layer.

The present invention specifically uses transparent materials including indium tin oxide and indium zinc oxide to fabricate the storage capacitor and the common electrode of a transflective liquid crystal display panel. This design not only reduces the utilization of non-transparent metal structures in the pixel region, but also increases the aperture ratio and transmitting rate and improves the optical performance of the display panel. Preferably, the dielectric property of the storage capacitor composed of indium tin oxide and indium zinc oxide could be used to provide sufficient capacity for the display panel and optimizes the electrical performance of the display panel.

These and other objectives of the present invention will no doubt become obvious to those of ordinary skill in the art after reading the following detailed description of the preferred embodiment that is illustrated in the various figures and drawings.

DETAILED DESCRIPTION

First Embodiment

Figure 1:
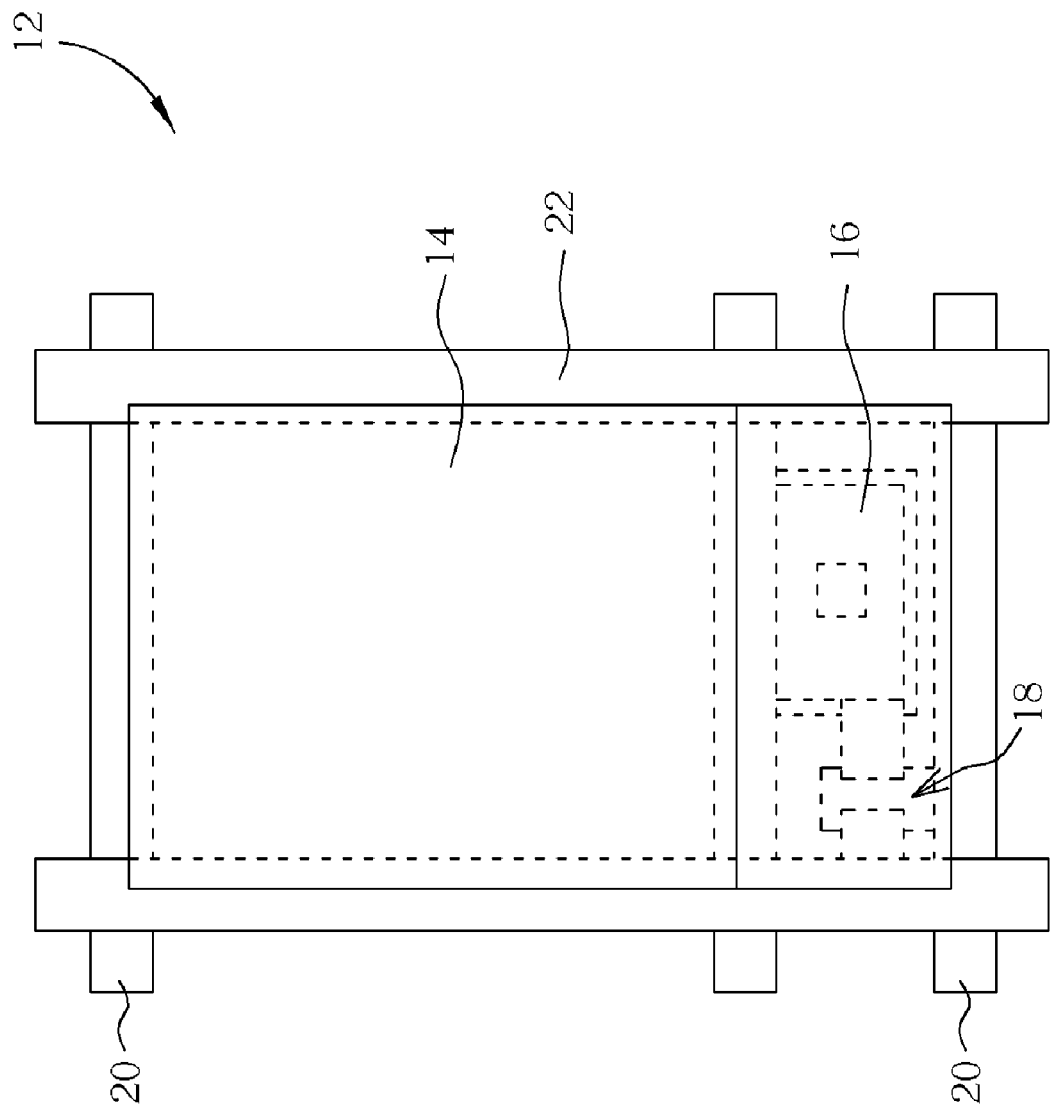
FIG. 1 illustrates a schematic view of a transflective liquid crystal display panel according to the prior art.
Figure 2:
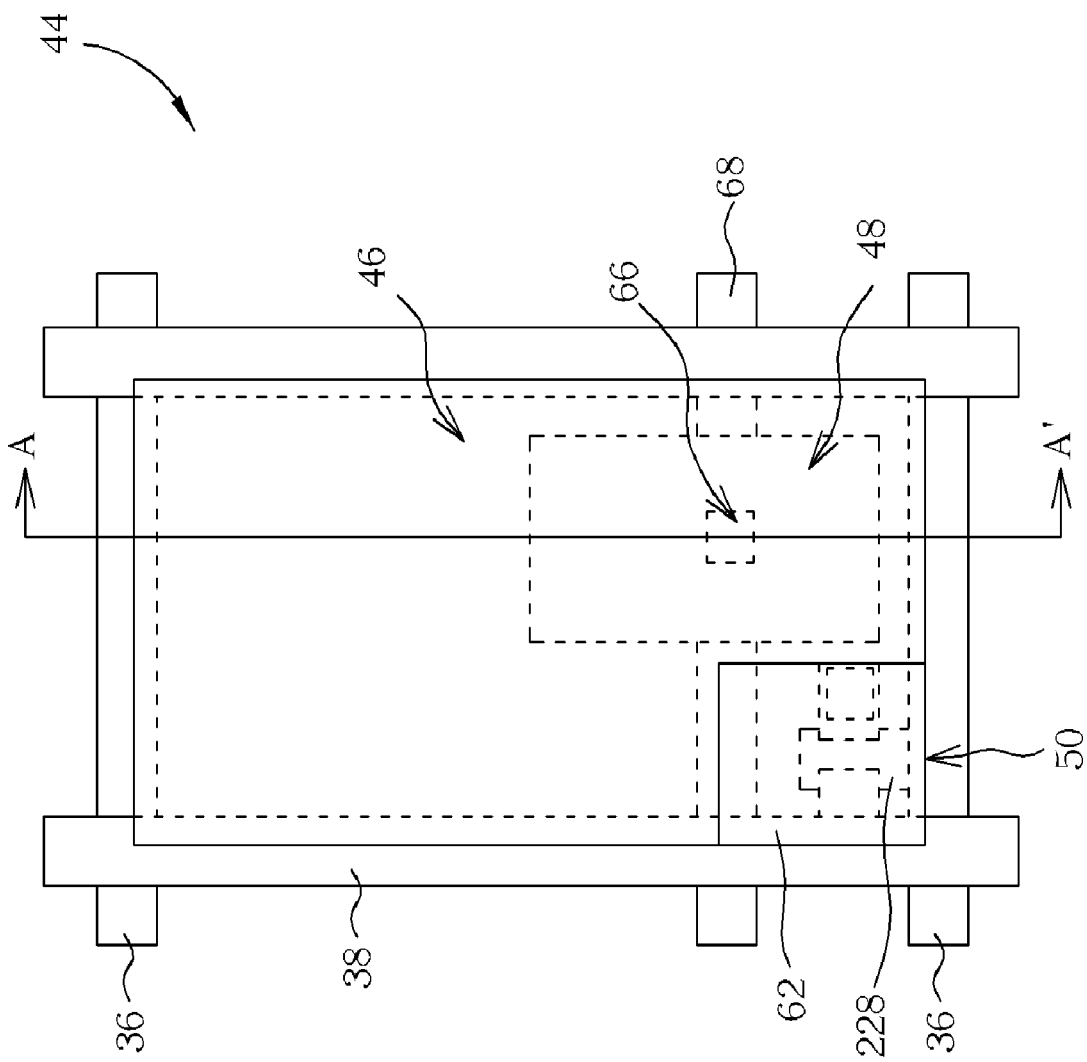
FIG. 2 illustrates a perspective view of utilizing an amorphous silicon process to fabricate a transflective liquid crystal display panel according a first embodiment of the present invention.
Figure 3:
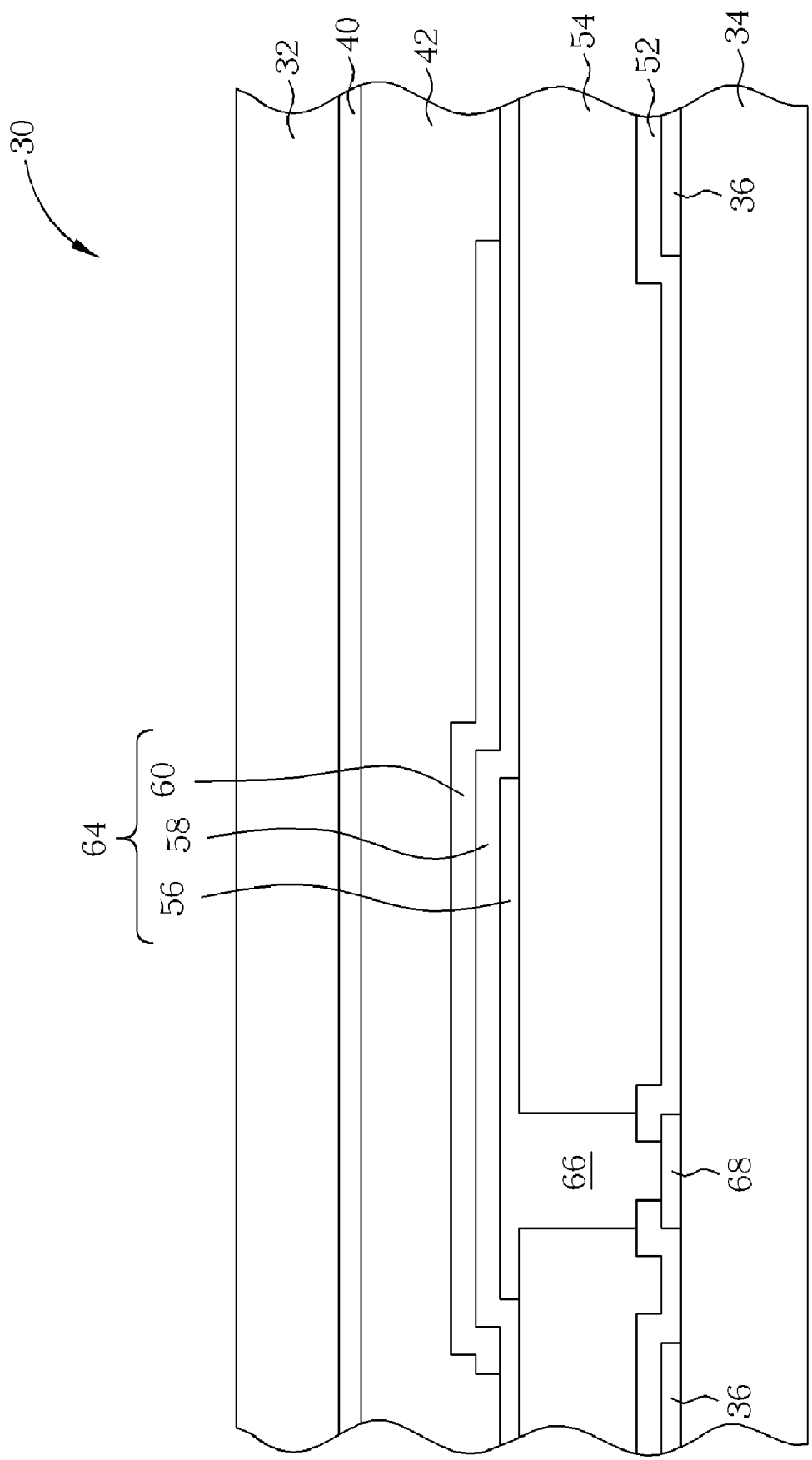
FIG. 3 illustrates a cross-sectional view of FIG. 2 along the sectional line AA'.

Referring to FIGS. 2-3, FIG. 2 illustrates a perspective view of utilizing an amorphous silicon process to fabricate a transflective liquid crystal display panel according a first embodiment of the present invention. FIG. 3 illustrates a cross-sectional view of FIG. 2 along the sectional line AA'. The transflective liquid crystal display panel 30 includes a top substrate 32, a bottom substrate 34 (such as an array substrate) disposed opposite to the top substrate 32, a plurality of wires 36, 38 disposed on the bottom substrate 34, a color filter 40 disposed between the top substrate 32 and the bottom substrate 34, a liquid crystal layer 42 disposed between the top substrate 32 and the bottom substrate 34, and at least a pixel 44 electrically connected to the wires. The wires preferably includes a plurality of scan lines 36 and data lines 38, and the color filter 40 can be disposed on the top substrate 32 to form a color filter substrate, or disposed on the bottom substrate 34 to form a color filter on array (COA) substrate, which are all within the scope of the present invention.

Preferably, the pixel 44 has a transmitting region 46, a capacitor region 48, and a transistor region 50. Additionally, a thin film transistor 228 is disposed on the transistor region 50, a dielectric layer 52 is disposed on the bottom substrate 34, a planarizing layer 54 is disposed on the dielectric layer 52, a first patterned transparent conductive layer 56 is disposed on the planarizing layer 54 of the capacitor region 48 and a portion of the transmitting region 46, a dielectric layer 58 is disposed on the first patterned transparent conductive layer 56 and the planarizing layer 54, a second patterned transparent conductive layer 60 is disposed on the dielectric layer 58 of the transistor region 50, the capacitor region 48, and the transmitting region 46, and a patterned reflective electrode 62 is disposed on the second patterned transparent conductive layer 60 of the transistor region 50 and areas adjacent to the transistor region 50. The patterned reflective electrode 62 is electrically connected to the thin film transistor 228 through the second patterned transparent conductive layer 60.

The second patterned transparent conductive layer 60 is used as a pixel electrode, and the first patterned transparent conductive layer 56, the dielectric layer 58, and the second patterned transparent conductive layer 60 are disposed to form a storage capacitor 64. The first patterned transparent conductive layer 56 is electrically connected to a common electrode 68 through a conductive plug 66, and the second patterned transparent conductive layer 60 is electrically connected to the thin film transistor 228 through another conductive plug (not shown). In this embodiment, the common electrode 68 can be composed of metal.

According to an embodiment of the present invention, the dielectric layer 52, the planarizing layer 54, and the dielectric layer 58 can be composed of oxides, silicon oxides, silicon oxynitrides, organic materials, inorganic materials, or a combination thereof, and the first patterned transparent conductive layer 56 and the second patterned transparent conductive layer 60 can be composed of transparent conductive material such as indium tin oxide (ITO) or indium zinc oxide (IZO).

It should be noted that the present invention specifically uses the aforementioned transparent material to fabricate the storage capacitor and common electrode of the transflective liquid crystal display panel. This design not only reduces the utilization of non-transparent metal structures, but also increases the aperture ratio and transmitting ratio of the display panel, thereby improving the overall optical performance of the display panel significantly. Moreover, the present invention also uses transparent conductive materials such as indium tin oxide or indium zinc oxide to fabricate a storage capacitor with sufficient capacity, which further optimizes the stability of the display panel.

Second Embodiment

Figure 4:
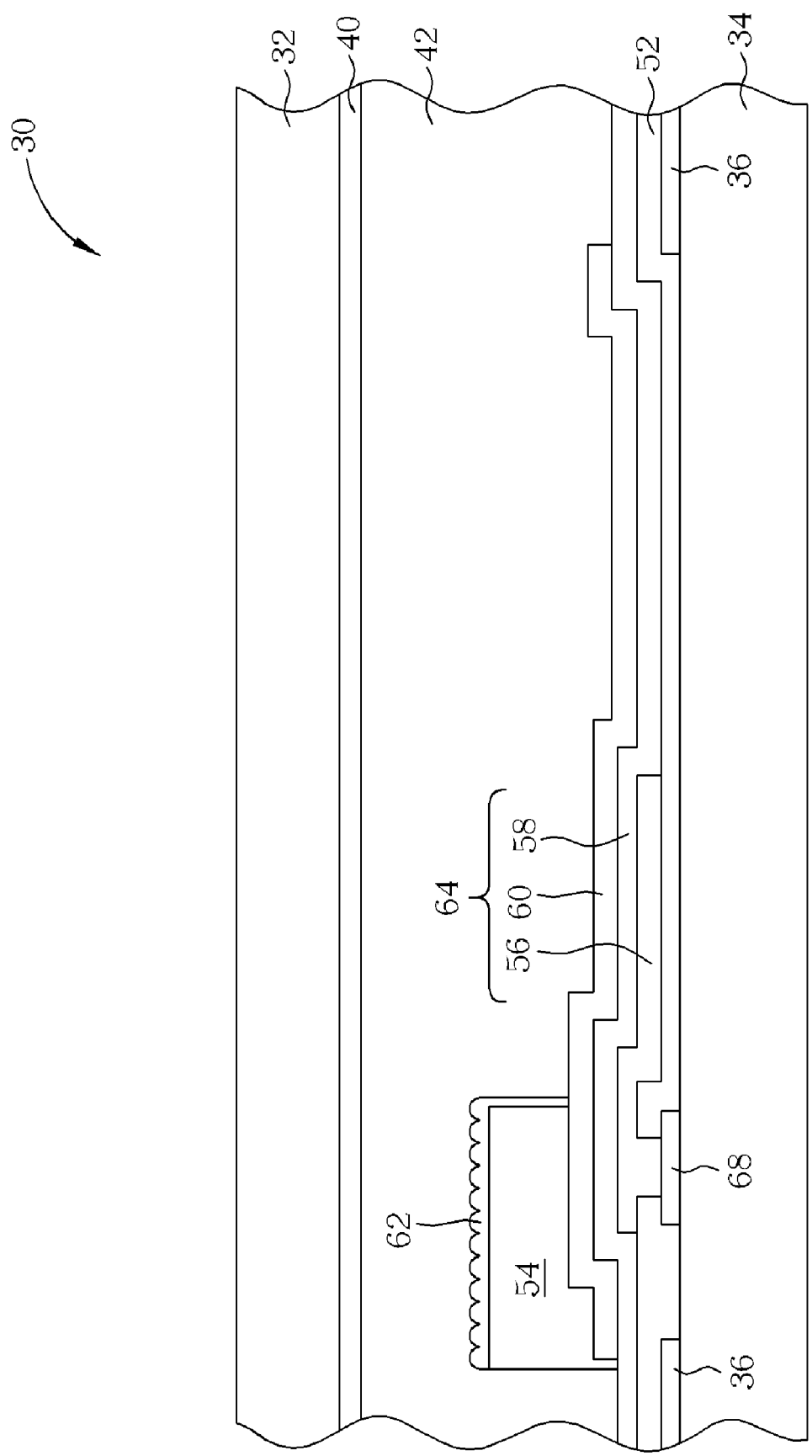
FIG. 4 illustrates a cross-sectional view of a transflective liquid crystal display panel according to the second embodiment of the present invention.

In addition to the method for forming the planarizing layer 54 disclosed in the first embodiment, the storage capacitor 64 could also be disposed under the planarizing layer 54. Referring to FIG. 4, FIG. 4 illustrates a cross-sectional view of a transflective liquid crystal display panel according to the second embodiment of the present invention. As shown in FIG. 4, a storage capacitor 64 composed of the first patterned transparent conductive layer 56, the dielectric layer 58, and the second patterned transparent conductive layer 60 is disposed on the bottom substrate 34. In contrast to the first embodiment, this embodiment specifically disposes the planarizing layer 54 on areas other than the transmitting region 46. For instance, the planarizing layer 54 and the reflective electrode 62 are only disposed on the transistor region 50. This design creates a much greater gap for the transmitting region of the display panel and completes the fabrication of a multi-gap transflective liquid crystal display panel.

Third Embodiment

Figure 5:
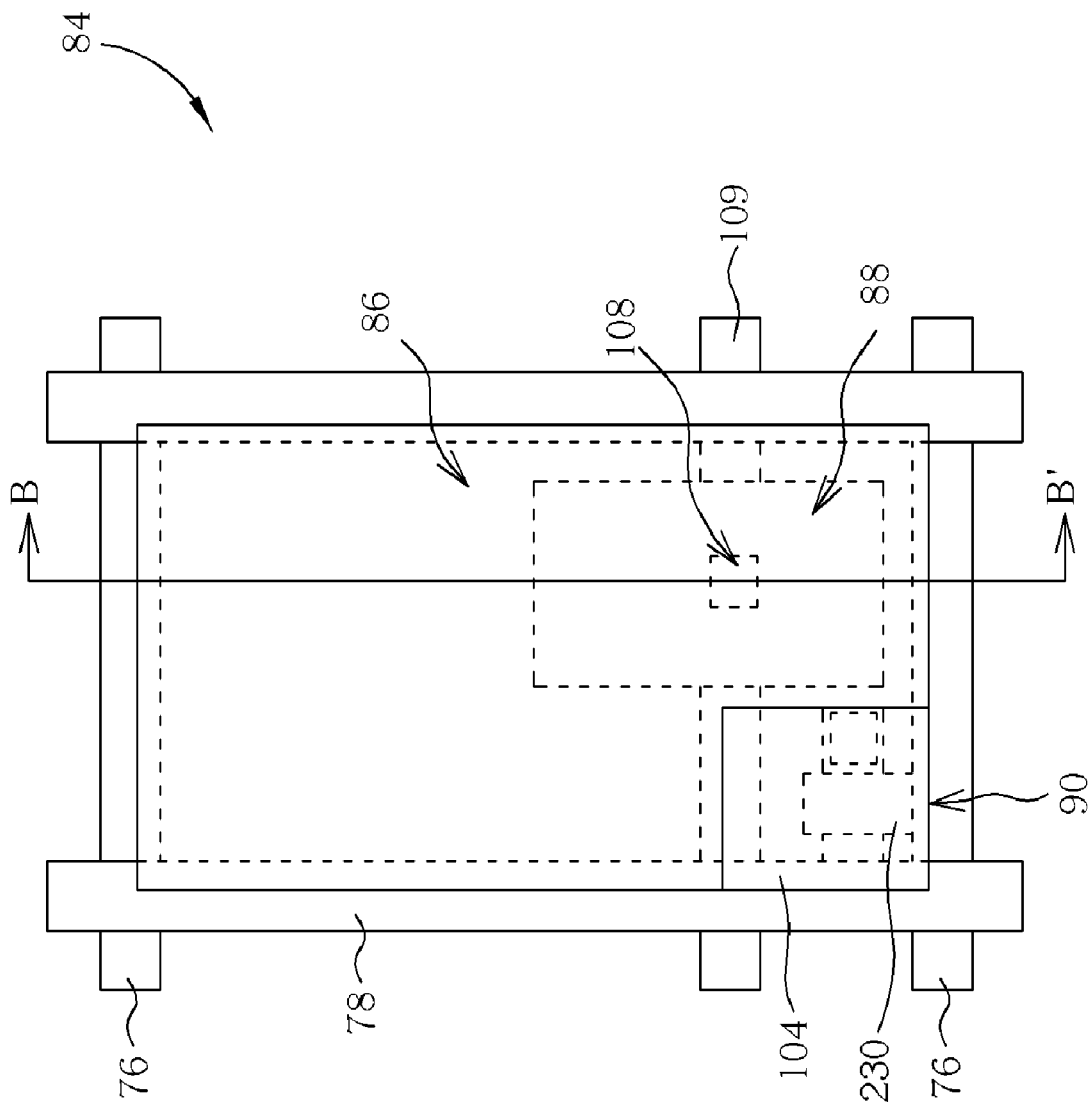
FIG. 5 illustrates a perspective view of utilizing a low temperature polysilicon process to fabricate a transflective liquid crystal display panel according to a third embodiment of the present invention.
Figure 6:
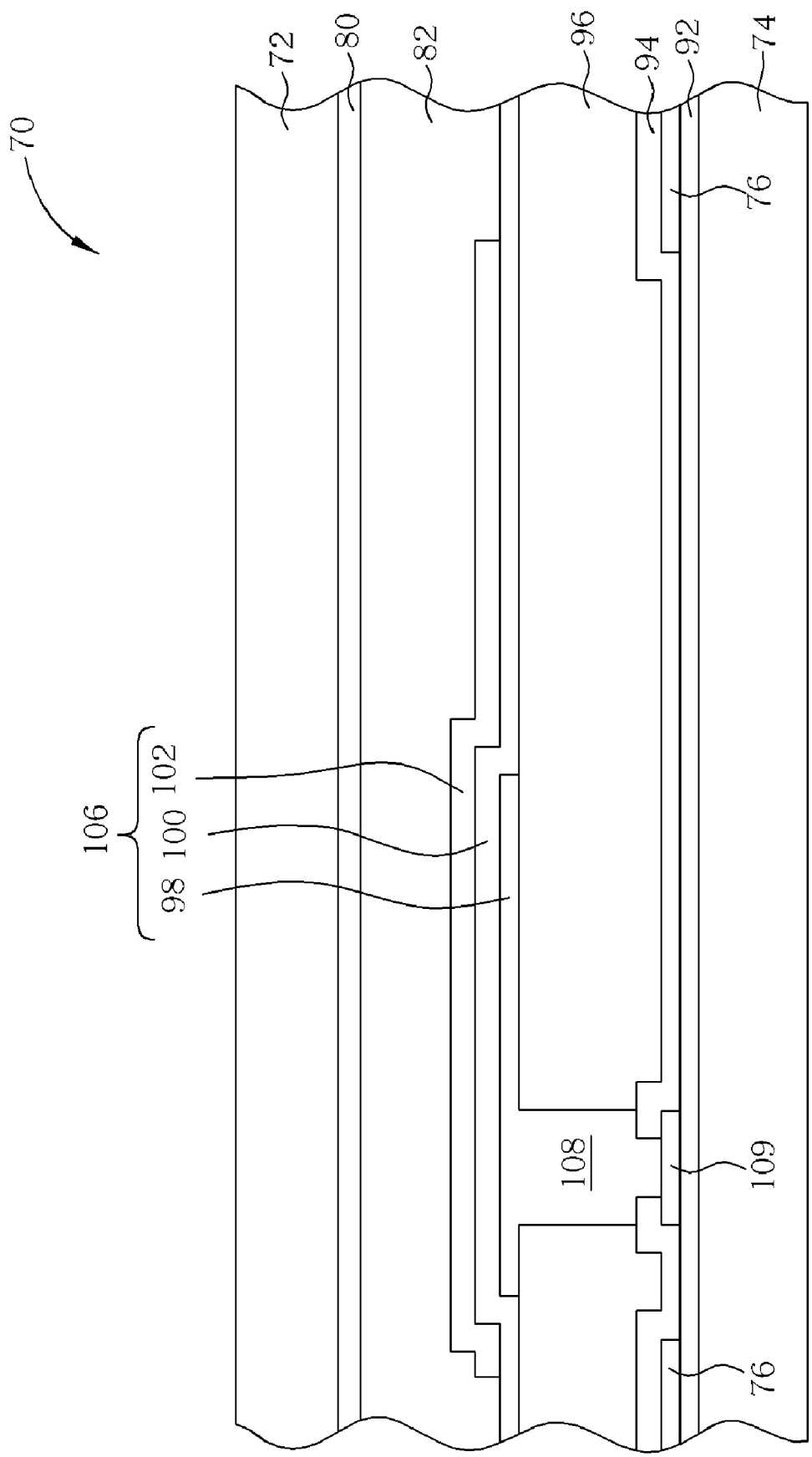
FIG. 6 illustrates a cross-section view of FIG. 5 along the sectional line BB'.

Referring to FIGS. 5-6, FIG. 5 illustrates a perspective view of utilizing a low temperature polysilicon process to fabricate a transflective liquid crystal display panel 70 according to a third embodiment of the present invention. FIG. 6 illustrates a cross-section view of FIG. 5 along the sectional line BB'. The transflective liquid crystal display panel 70 includes a top substrate 72, a bottom substrate 74 (such as an array substrate) disposed opposite to the top substrate 70, a plurality of wires 76 and 78 disposed on the bottom substrate 74, a color filter 80 disposed between the top substrate 72 and the bottom substrate 74, a liquid crystal layer 82 disposed between the top substrate 72 and the bottom substrate 74, and at least a pixel 84 electrically connected to the wires 76 and 78. The wires preferably include a plurality of scan lines 76 and data lines 78, and the color filter 80 can be disposed on the top substrate 72 to form a color filter substrate, or disposed on the bottom substrate 74 to form a color filter on array (COA) substrate, which are all within the scope of the present invention.

The pixel 86 includes a transmitting region 86, a capacitor region 88, and a transistor region 90. Additionally, a thin film transistor 230 fabricated with a low temperature polysilicon process is disposed on the transistor region 90 of the pixel 86, a dielectric layer 92 is disposed on the bottom substrate 74, a dielectric layer 94 is disposed on the scan lines 76 and the dielectric layer 92, a planarizing layer 96 is disposed on the dielectric layer 94, a first patterned transparent conductive layer 98 is disposed on the planarizing layer 96 of the capacitor region 88 and a portion of the transmitting region 86, a dielectric layer 100 is disposed on the bottom substrate 74, a second patterned transparent conductive layer 102 is disposed on the dielectric layer 100 of the transistor region 90, the capacitor region 88, and the transmitting region 86, and a patterned reflective electrode 104 disposed on the second patterned transparent conductive layer 102 of the transistor region 90 and area adjacent to the transistor region 90. The patterned reflective electrode 104 is electrically connected to the thin film transistor 230 through the second patterned transparent conductive layer 102.

By using a low temperature polysilicon process to fabricate the display panel 70, an additional semiconductor layer (now shown) and the dielectric layer 92 are formed on the bottom substrate 74. The dielectric layer 92 is formed corresponding to the gate dielectric layer (not shown) of the thin film transistor fabricated in the transistor region 90, and the details of which are not further explained herein for the sake of brevity.

Preferably, the second patterned transparent conductive layer 102 is used as a pixel electrode, and the first patterned transparent conductive layer 98, the dielectric layer 100, and the second patterned transparent conductive layer 102 are used to form a storage capacitor 106. The first patterned transparent conductive layer 98 is electrically connected to a common electrode 109 of the capacitor region 88 through a conductive plug 108, and the second patterned transparent conductive layer 102 is electrically connected to the thin film transistor 230 of the transistor region 90 through another conductive plug (not shown). In this embodiment, the common electrode 109 is composed of metal. The dielectric layers 92, 94, 100, and the planarizing layer 96 can be composed of oxides, silicon oxides, silicon oxynitrides, organic materials, inorganic materials, or combination thereof, and the first patterned transparent conductive layer 98 and the second patterned transparent conductive layer 102 can be composed of transparent conductive materials such as indium tin oxides or indium tin oxides.

Fourth Embodiment

Figure 7:
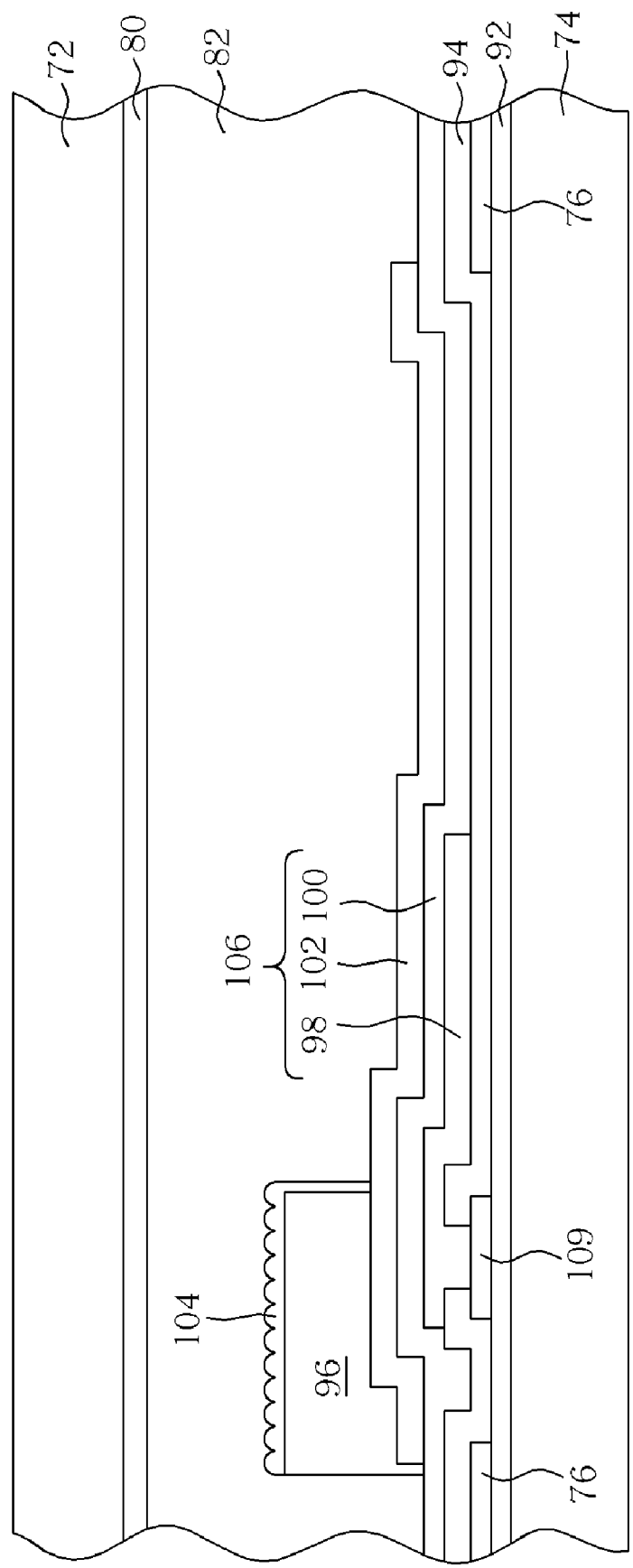
FIG. 7 illustrates a cross-sectional view of a transflective liquid crystal display panel according to a fourth embodiment of the present invention.

In addition to the method for forming the planarizing layer 96 disclosed in the third embodiment, the storage capacitor 106 could also be disposed under the planarizing layer 96. Referring to FIG. 7, FIG. 7 illustrates a cross-sectional view of a transflective liquid crystal display panel according to a fourth embodiment of the present invention. As shown in FIG. 7, a storage capacitor 106 composed of the first patterned transparent conductive layer 98, the dielectric layer 100, and the second patterned transparent conductive layer 102 is disposed on the bottom substrate 74. In this embodiment, the planarizing layer 96 is disposed specifically in areas outside the transmitting region 86, such as the reflecting region of the transistor region 90 and the capacitor region 88. This design ultimately creates a much greater gap for the transmitting region 86 of display panel and completes the fabrication of the multi-gap transflective liquid crystal display panel.

Fifth Embodiment

Figure 8:
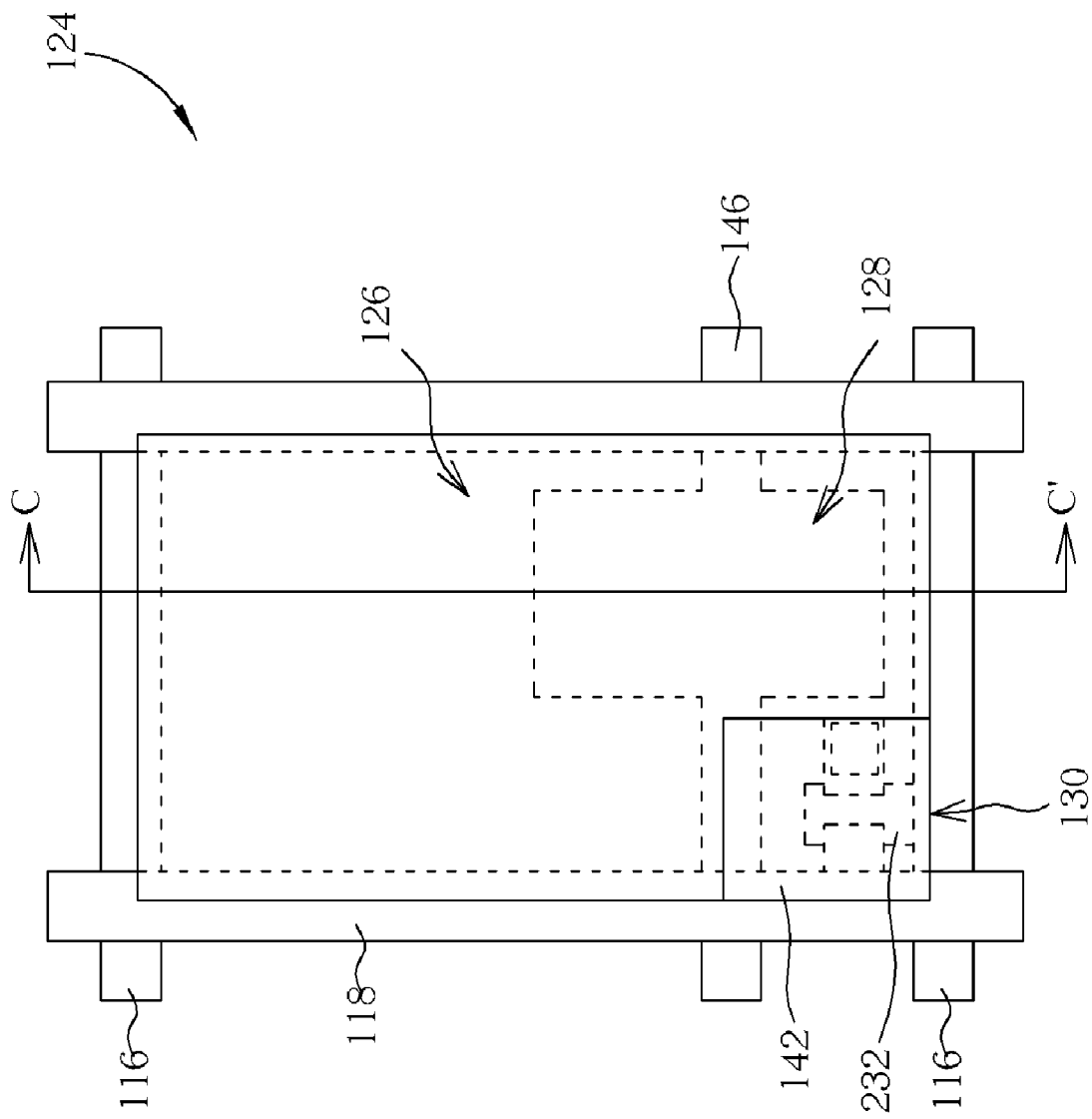
FIG. 8 illustrates a perspective view of utilizing an amorphous silicon process to fabricate a transflective liquid crystal display panel according to a fifth embodiment of the present invention.
Figure 9:
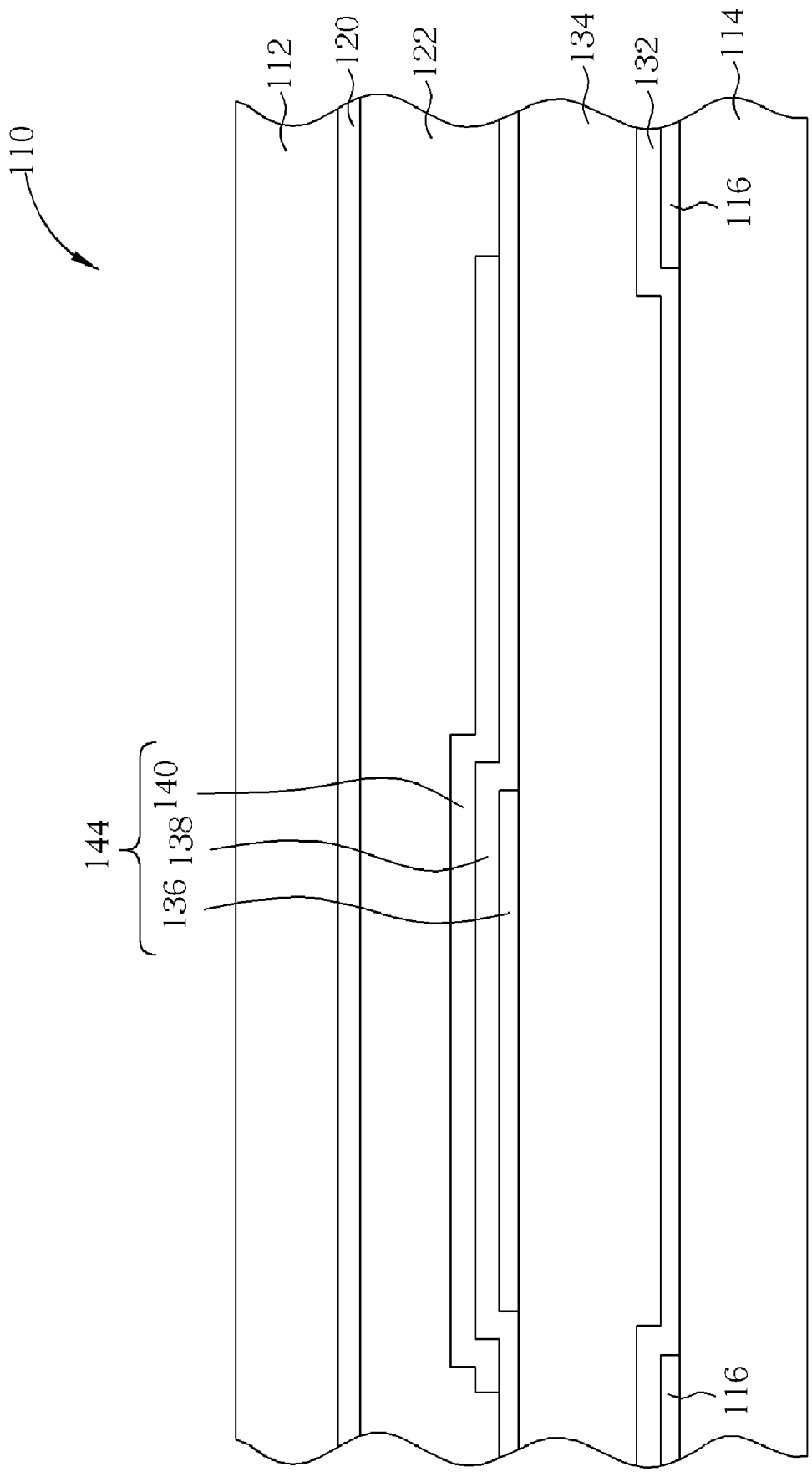
FIG. 9 illustrates a cross-sectional view of FIG. 8 along the sectional line CC'.

Referring to FIGS. 8-9, FIG. 8 illustrates a perspective view of utilizing an amorphous silicon process to fabricate a transflective liquid crystal display panel 110 according to a fifth embodiment of the present invention. FIG. 9 illustrates a cross-sectional view of FIG. 8 along the sectional line CC'. The transflective liquid crystal display panel 110 includes a top substrate 112, a bottom substrate 114 (such as an array substrate) disposed opposite to the top substrate 112, a plurality of wires 116, 118 disposed on the bottom substrate 114, a color filter 120 disposed between the top substrate 112 and the bottom substrate 114, a liquid crystal layer 122 disposed between the top substrate 112 and the bottom substrate 114, and at least a pixel 124 electrically connected to the wires. The wires preferably includes a plurality of scan lines 116 and data lines 118, and the color filter 120 can be disposed on the top substrate 112 to form a color filter substrate, or disposed on the bottom substrate 114 to form a color filter on array substrate (COA) substrate, which are all within the scope of the present invention.

The pixel 124 includes a transmitting region 126, a capacitor region 128, and a transistor region 130. Additionally, a thin film transistor 232 fabricated with an amorphous silicon process is disposed on the transistor region 130, a dielectric layer 132 is disposed on the bottom substrate 114, a planarizing layer 134 is disposed on the dielectric layer 132, a first patterned transparent conductive layer 136 is disposed on the planarizing layer 134 of the capacitor region 128 and a portion of the transmitting region 126, a dielectric layer 138 is disposed on the first patterned transparent conductive layer 136, a second patterned transparent conductive layer 140 is disposed on the dielectric layer 132 of the transistor region 130, the capacitor region 128, and the transmitting region 132, and a patterned reflective electrode 142 is disposed on the transistor region 130. The patterned reflective electrode 142 is electrically connected to the thin film transistor 232 through the second patterned transparent conductive layer 140.

The second patterned transparent conductive layer 140 is used as a pixel electrode, and the first patterned transparent conductive layer 136, the dielectric layer 138, and the second transparent conductive layer 140 are used to form a storage capacitor 144. In this embodiment, the common electrode 146 is composed of transparent conductive material such as indium tin oxide or indium zinc oxide, and the first patterned transparent conductive layer 136 is directly connected to the common electrode 146, thus eliminating the need of using conductive plugs to electrically connect the first patterned transparent conductive layer 136 in the transmitting region 126 and the capacitor region 128. In other words, the area of the transmitting region 126 of this embodiment could be expanded to the entire capacitor region 128, thereby increasing the aperture ratio and transmitting rate of the display panel. Moreover, the area of the capacitor region 128 could be adjusted accordingly. For instance, the capacitor region 128 could be expanded to cross over the common electrode 146, thereby increasing the overall area of the capacitor.

Depending on the design of the product, a low temperature polysilicon process could be employed to complete the fabrication of the transflective liquid crystal display panel 110. For instance, a polysilicon layer (not shown) can be formed on the bottom substrate 114 before the deposition of the dielectric layer 132, and a dielectric layer (not shown) corresponding to the gate dielectric of the low temperature polysilicon thin film transistor can be formed accordingly. After the formation of such dielectric layer, the dielectric layer 132 and the storage capacitor 144 can be formed on the dielectric layer corresponding to the thin film transistor to complete the fabrication of the transflective liquid crystal display panel 110.

Sixth Embodiment

Figure 10:
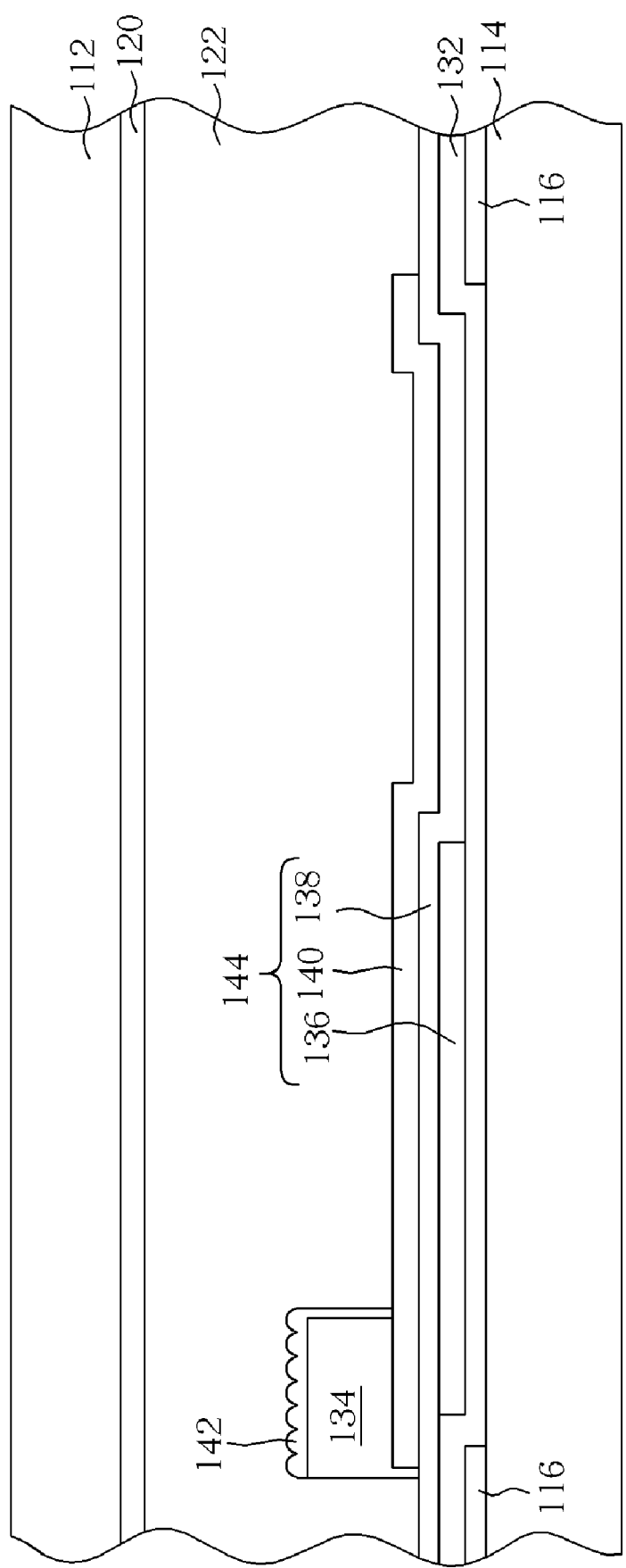
FIG. 10 illustrates a cross-sectional view of a transflective liquid crystal display panel according to a sixth embodiment of the present invention.

In addition to the method for forming the planarizing layer 134 disclosed in the fifth embodiment, the storage capacitor 144 could also be disposed under the planarizing layer 134. Referring to FIG. 10, FIG. 10 illustrates a cross-sectional view of a transflective liquid crystal display panel according to a sixth embodiment of the present invention. As shown in FIG. 10, a storage capacitor 144 composed of the first patterned transparent conductive layer 136, the dielectric layer 138, and the second patterned transparent conductive layer 140 is disposed on the bottom substrate 114. In contrast to the aforementioned embodiments, this embodiment not only disposes the planarizing layer 134 on areas outside the transmitting region 126, but also utilizes a transparent material to fabricate the common electrode 146, thereby increasing the overall aperture ratio and the transmitting rate of the display panel.

Depending on the design of the product, a low temperature polysilicon process could be employed to complete the fabrication of the transflective liquid crystal display panel. For instance, a polysilicon layer (not shown) can be formed on the bottom substrate 114 of the display panel before the dielectric layer 132 is deposited, and a dielectric layer (not shown) corresponding to the gate dielectric of the low temperature polysilicon thin film transistor can be formed accordingly. After the formation of such dielectric layer, the dielectric layer 132 and the storage capacitor 144 are formed on said dielectric layer to complete the fabrication of the transflective liquid crystal display panel 110.

Seventh Embodiment

Figure 11:
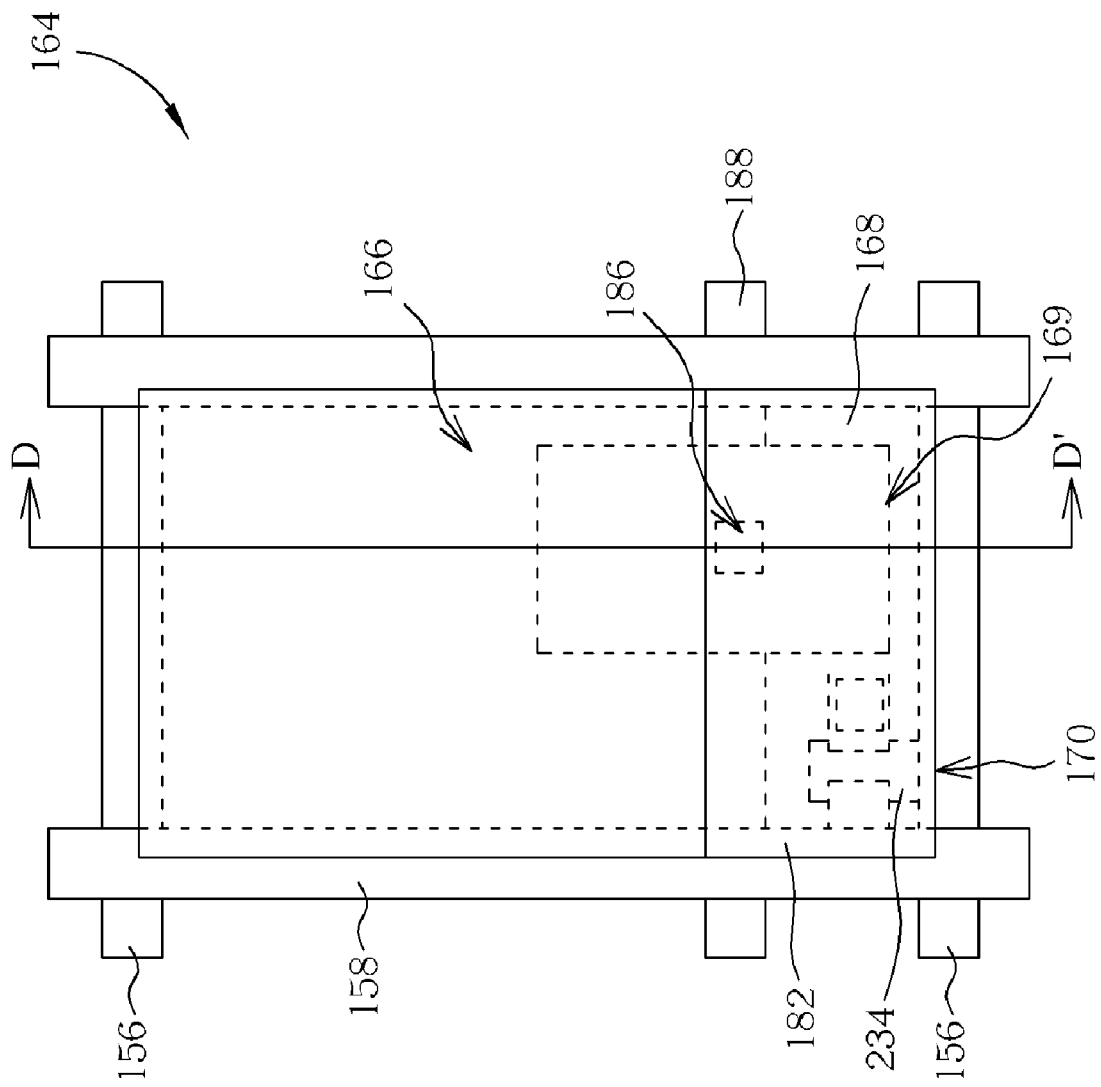
FIG. 11 illustrates a perspective view of utilizing an amorphous silicon process to fabricate a transflective liquid crystal display panel according to a seventh embodiment of the present invention.
Figure 12:
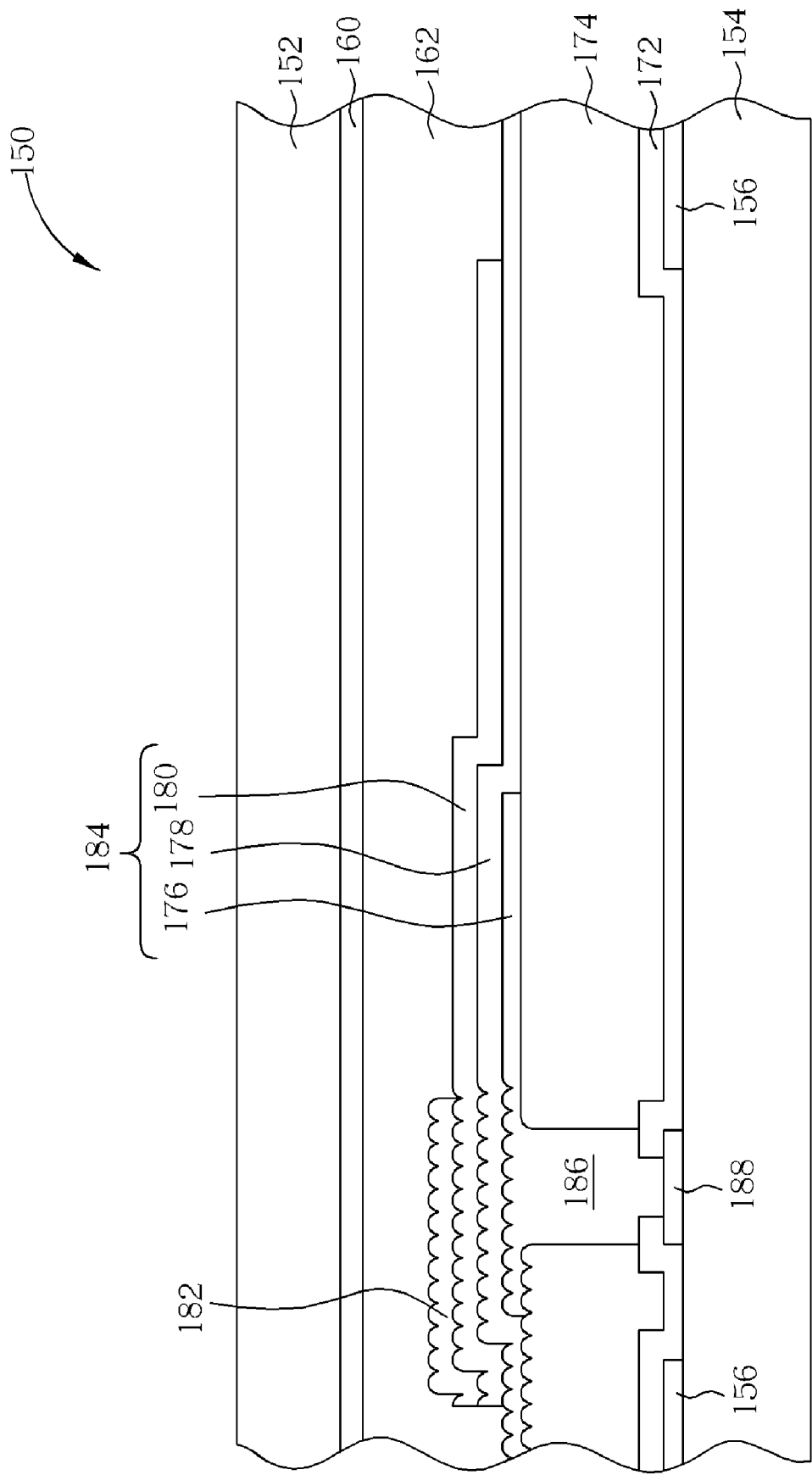
FIG. 12 illustrates a cross-sectional view of FIG. 11 along the sectional line DD'.

Referring to FIGS. 11-12, FIG. 11 illustrates a perspective view of utilizing an amorphous silicon process to fabricate a transflective liquid crystal display panel 150 according to a seventh embodiment of the present invention. FIG. 12 illustrates a cross-sectional view of FIG. 11 along the sectional line DD'. The transflective liquid crystal display panel 150 includes a top substrate 152, a bottom substrate 154 (such as an array substrate) disposed opposite to the top substrate 152, a plurality of wires disposed on the bottom substrate 154, a color filter 160 disposed between the top substrate 152 and the bottom substrate 154, a liquid crystal layer 162 disposed between the top substrate 152 and the bottom substrate 154, and at least one pixel 164 electrically connected to the wires. The wires preferably includes a plurality of scan lines 156 and data lines 158, and the color filter 160 can be disposed on the top substrate 152 to form a color filter substrate, or disposed on the bottom substrate 154 to form a color filter on array (COA) substrate, which are all within the scope of the present invention.

The pixel 164 includes a transmitting region 166 and a reflecting region 168, in which the reflecting region 168 further includes a capacitor region 169 and a transistor region 170. A thin film transistor 234 fabricated with an amorphous silicon process is disposed on the transistor region 170, a dielectric layer 172 is disposed on the bottom substrate 154, a planarizing layer 174 is disposed on the dielectric layer 152, a first patterned transparent conductive layer 176 is disposed on the planarizing layer 174 of the capacitor region 169 and a portion of the transmitting region 166, a dielectric layer 178 is disposed on the first patterned transparent conductive layer 176, a second patterned transparent conductive layer 180 is disposed on the dielectric layer 178, and a patterned reflective electrode 182 is disposed on the second patterned transparent conductive layer 180 of the reflecting region 168. The patterned reflective electrode 182 is electrically connected to the thin film transistor 234 through the second patterned transparent conductive layer 180.

The second patterned transparent conductive layer 180 is used as a pixel electrode, and the first patterned transparent conductive layer 176, the dielectric layer 178, and the second transparent conductive layer 180 are used to form a storage capacitor. The first transparent conductive layer 176 is electrically connected to the common electrode 188 disposed on the bottom substrate 154 of the reflecting region 168 through a conductive plug 186, and the second transparent conductive layer 180 is connected to the thin film transistor 234 through another conductive plug (not shown). In this embodiment, the common electrode 188 is composed of metal.

In contrast to the aforementioned embodiments, the first patterned transparent conductive layer 176 is extended to the transmitting region 166 to expand the area of the storage capacitor. The patterned reflective electrode 182 disposed on the transistor region 170 is also extended to the capacitor region 169 to increase the overall area of the reflecting region 168, thereby increasing the reflectivity of the display panel.

Depending on the design of the product, a low temperature polysilicon process can be employed to complete the fabrication of the transflective liquid crystal display panel 150. For instance, a polysilicon layer (not shown) can be formed on the bottom substrate 154 before the deposition of the dielectric layer 172, and a dielectric layer (not shown) corresponding to the gate dielectric of the low temperature polysilicon thin film transistor can be formed accordingly. After the formation of such dielectric layer, the dielectric layer 172 and the storage capacitor 184 can be formed on such dielectric layer corresponding to the thin film transistor to complete the fabrication of the display panel 150.

Eighth Embodiment

Figure 13:
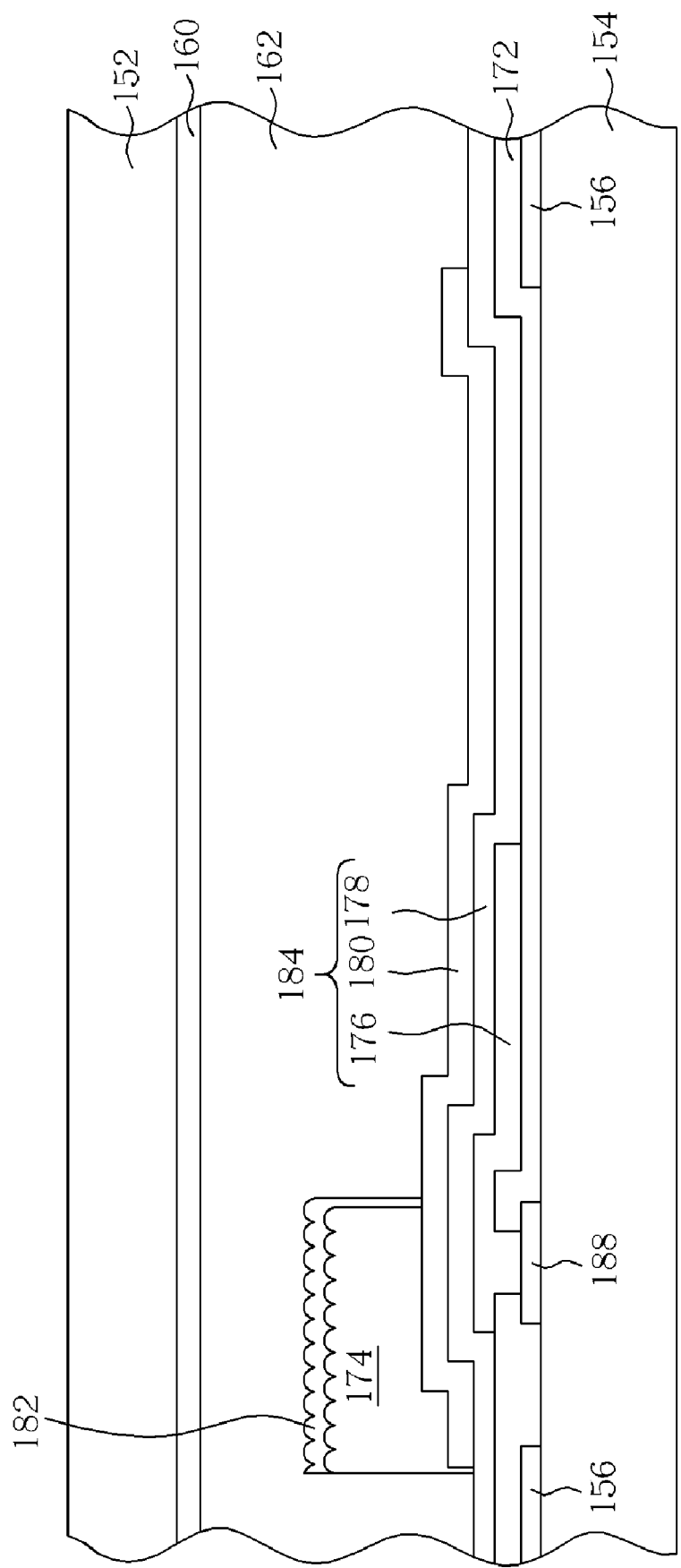
FIG. 13 illustrates a cross-sectional view of a transflective liquid crystal display panel according to an eighth embodiment of the present invention.

In addition to the method for forming the planarizing layer 174 disclosed in the seventh embodiment, the storage capacitor 184 could also be disposed under the planarizing layer 174. Referring to FIG. 13, FIG. 13 illustrates a cross-sectional view of a transflective liquid crystal display panel according to an eighth embodiment of the present invention. As shown in FIG. 13, a storage capacitor 184 composed of the first patterned transparent conductive layer 176, the dielectric layer 178, and the second patterned transparent conductive layer 180 is disposed on the bottom substrate 154. In contrast to the aforementioned embodiments, this embodiment specifically disposes the planarizing layer 174 on areas outside the transmitting region 166, such as on the reflecting region 168 of the display panel. This design creates a much greater gap for the transmitting region 166 of display panel and completes the fabrication of the transflective liquid crystal display panel 150.

Depending on the demand of the fabrication, a low temperature polysilicon process could be employed to complete the fabrication of the transflective liquid crystal display panel. For instance, a polysilicon layer (not shown) can be formed on the bottom substrate 154 of the display panel before the dielectric layer 172 is disposed, and a dielectric layer (not shown) corresponding to the gate dielectric of the low temperature polysilicon thin film transistor can be formed accordingly. After the formation of such dielectric layer, the dielectric layer 172, the storage capacitor 184, and the planarizing layer 174 are formed on said dielectric layer to complete the fabrication of the transflective liquid crystal display panel 150.

Ninth Embodiment

Figure 14:
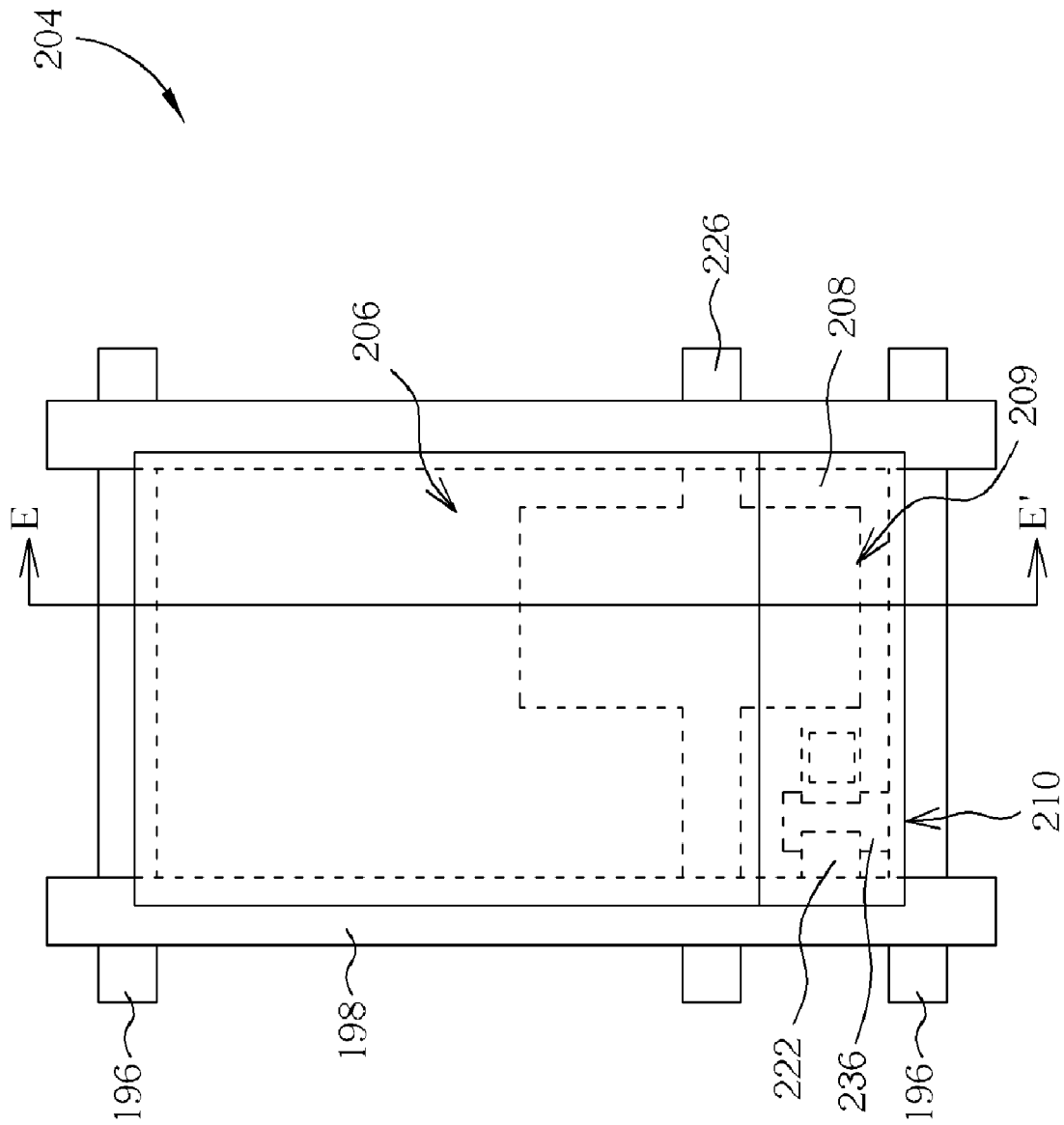
FIG. 14 illustrates a perspective view of utilizing an amorphous silicon process to fabricate a transflective liquid crystal display panel according to a ninth embodiment of the present invention.
Figure 15:
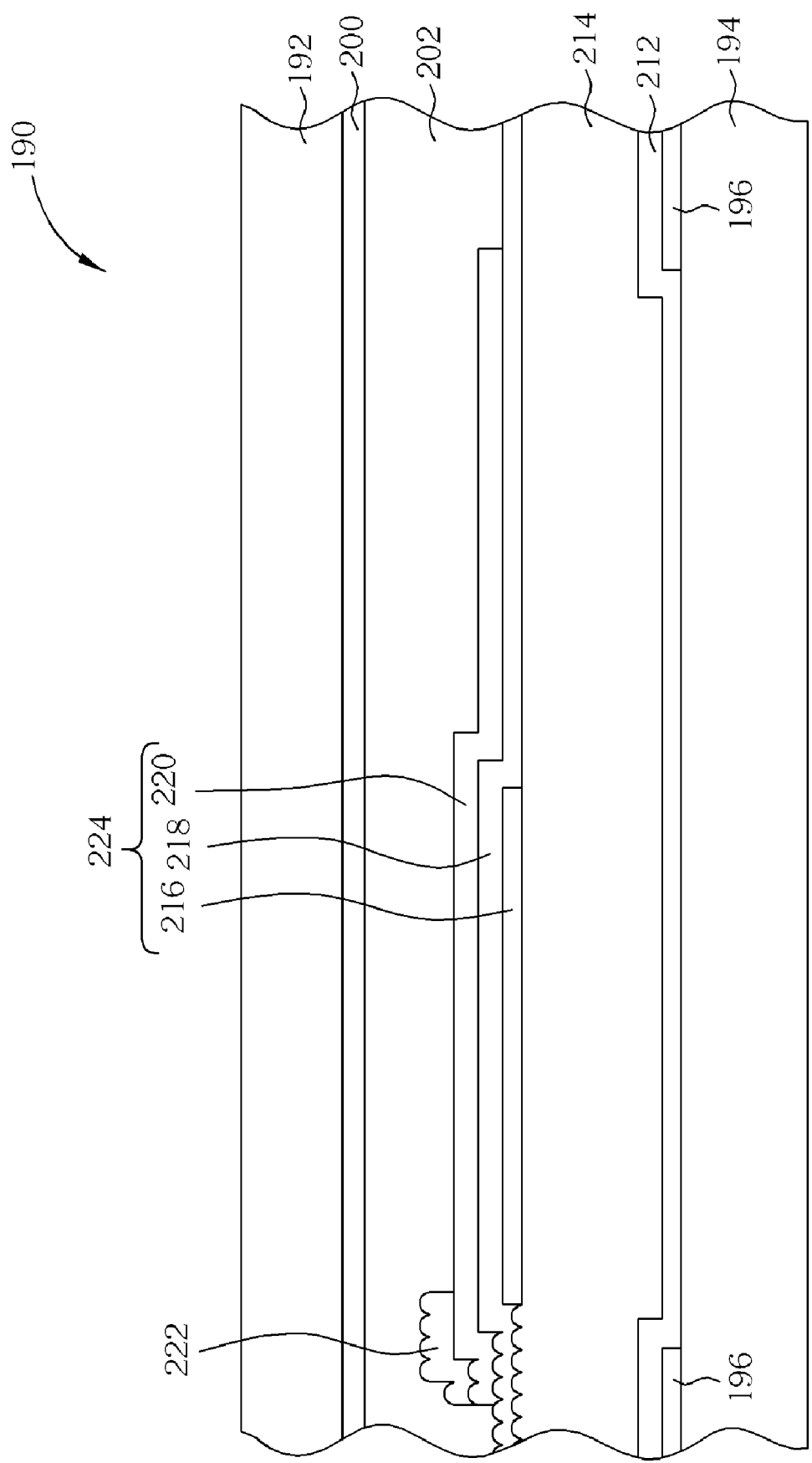
FIG. 15 illustrates a cross-sectional view of FIG. 14 along the sectional line EE'.

Referring to FIGS. 14-15, FIG. 14 illustrates a perspective view of utilizing an amorphous silicon process to fabricate a transflective liquid crystal display panel 190 according to a ninth embodiment of the present invention. FIG. 15 illustrates a cross-sectional view of FIG. 14 along the sectional line EE'. The transflective liquid crystal display panel 190 includes a top substrate 192, a bottom substrate 194 (such as an array substrate) disposed opposite to the top substrate 192, a plurality of wires disposed on the bottom substrate 194, a color filter 200 disposed between the top substrate 192 and the bottom substrate 194, a liquid crystal layer 202 disposed between the top substrate 192 and the bottom substrate 194, and at least one pixel 204 electrically connected to the wires. The wires preferably includes a plurality of scan lines 196 and data lines 198, and the color filter 200 can be disposed on the top substrate 192 to form a color filter substrate, or disposed on the bottom substrate 194 to form a color filter on array (COA) substrate, which are all within the scope of the present invention.

The pixel 204 includes a transmitting region 206 and a reflecting region 208, in which the reflecting region 208 further includes a capacitor region 209 and a transistor region 210. A thin film transistor 236 fabricated with an amorphous silicon process is disposed on the transistor region 210, a dielectric layer 212 is disposed on the bottom substrate 194, a planarizing layer 214 is disposed on the dielectric layer 212, a first patterned transparent conductive layer 216 is disposed on the planarizing layer 214 of the capacitor region 209 and a portion of the transmitting region 206, a dielectric layer 218 is disposed on the first patterned transparent conductive layer 216, a second patterned transparent conductive layer 220 is disposed on the dielectric layer 218, and a patterned reflective electrode 222 disposed on the second patterned transparent conductive layer 220 of the reflecting region 208. The patterned reflective electrode 222 is electrically connected to the thin film transistor 236 through the second patterned transparent conductive layer 220.

The second patterned transparent conductive layer 220 is used as a pixel electrode, and the first patterned transparent conductive layer 216, the dielectric layer 218, and the second patterned transparent conductive layer 220 are used to form a storage capacitor 224. Similar to the fifth embodiment of the present invention, the common electrode 226 is composed of indium tin oxide or indium zinc oxide, and the first patterned transparent conductive layer 216 of this embodiment is directly connected to the common electrode 226, instead of forming a conductive plug in the transmitting region 206 and the capacitor region 209 to electrically connect the first patterned transparent conductive layer 216 and the common electrode 226. By using this design, the transmitting region 206 of the display panel 190 can be expanded to the entire capacitor region 209, thereby increasing the overall aperture ratio and transmitting rate. Moreover, the area of the capacitor can be further expanded by extending the capacitor region 209 over the common electrode 226, which is also within the scope of the present invention.

Similar to the seventh embodiment, the patterned reflective electrode 222 of this embodiment is extended to the capacitor region 209 to increase the overall area of the reflecting region 208, thereby increasing the reflectivity of the display panel.

Depending on the demand of the fabrication, a low temperature polysilicon process can be employed to complete the fabrication of the transflective liquid crystal display panel 190. For instance, a polysilicon layer (not shown) can be formed on the bottom substrate 194 before the deposition of the dielectric layer 212, and a dielectric layer (not shown) corresponding to the gate dielectric of the low temperature polysilicon thin film transistor can be formed accordingly. After such dielectric layer is formed, the dielectric layer 212 and the storage capacitor 224 can be formed on such dielectric layer to complete the fabrication of the display panel 190.

Tenth Embodiment

Figure 16:
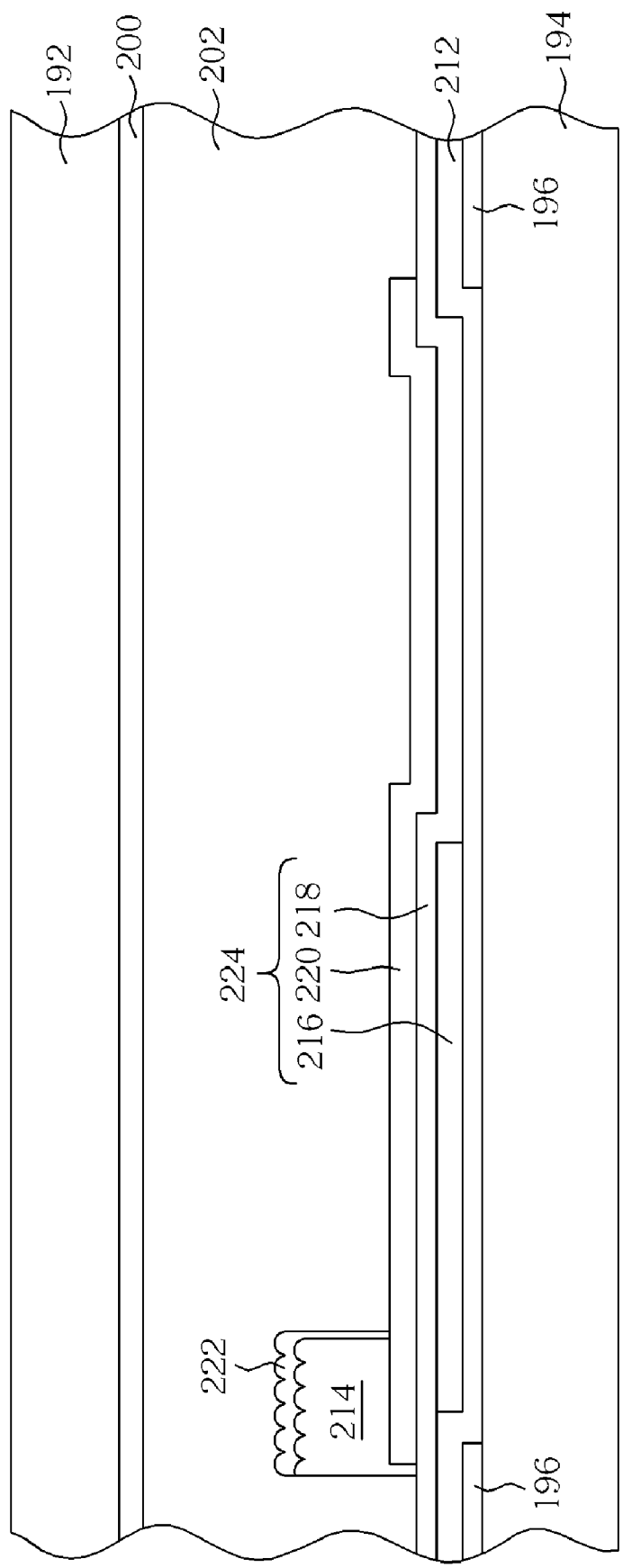
FIG. 16 illustrates a cross-sectional view of a transflective liquid crystal display panel according to a tenth embodiment of the present invention.

In addition to the method for forming the planarizing layer 214 disclosed in the ninth embodiment, the storage capacitor 224 could also be disposed under the planarizing layer 214. Referring to FIG. 16, FIG. 16 illustrates a cross-sectional view of a transflective liquid crystal display panel according to a tenth embodiment of the present invention. As shown in FIG. 16, a storage capacitor composed of the first patterned transparent conductive layer 216, the dielectric layer 218, and the second patterned transparent conductive layer 220 is disposed on the bottom substrate 194. Similar to the aforementioned ninth embodiment, the planarizing layer 214 of this embodiment is disposed on the reflecting region 208 of the display panel, which would create a much greater gap for the transmitting region 206 of the display panel.

Depending on the demand of the fabrication, a low temperature polysilicon process could also be employed to complete the fabrication of the transflective liquid crystal display panel. For instance, a polysilicon layer (not shown) can be formed on the bottom substrate 194 of the display panel before the dielectric layer 212 is disposed, and a dielectric layer (not shown) corresponding to the gate dielectric of the low temperature polysilicon thin film transistor can be formed accordingly. After the formation of such dielectric layer, the dielectric layer 212, the storage capacitor 224, and the planarizing layer 214 are formed on said dielectric layer to complete the fabrication of the display panel 190.

Overall, the present invention specifically uses transparent materials including indium tin oxide and indium zinc oxide to fabricate the storage capacitor and the common electrode of the transflective liquid crystal display panel. This design not only reduces the utilization of non-transparent metal structures in the pixel region, but also increases the aperture ratio and transmitting rate and improves the optical performance of the display panel. Preferably, the dielectric property of the storage capacitor composed of indium tin oxide and indium zinc oxide could be used to provide sufficient capacity for the display panel and optimize the electrical performance of the display panel.

According to the demand of the fabrication process, an amorphous silicon thin film transistor fabrication process or a low temperature thin polysilicon thin film transistor process can be employed to complete the fabrication of the transflective liquid crystal display panel of the present invention. Moreover, the reflecting layer disposed in the transistor region could be extended to the capacitor region to increase the overall area of the capacitor region and at the same time improve the reflectivity of the display panel.

Those skilled in the art will readily observe that numerous modifications and alterations of the device and method may be made while retaining the teachings of the invention.

What is claimed is:

1. A liquid crystal display panel, comprising:
   an array substrate having a transmitting region, a capacitor region, and a transistor region;
   a storage capacitor disposed on the array substrate, comprising:
       a first transparent conductive layer disposed on the transmitting region and capacitor region of the array substrate;
       a dielectric layer disposed on the first transparent conductive layer and the array substrate;
       a second transparent conductive layer disposed on the dielectric layer;
       a reflective layer disposed on a portion of the second transparent conductive layer;
   an opposing substrate disposed opposite to the array substrate; and
   a liquid crystal layer disposed between the array substrate and the opposing substrate.

2. The liquid crystal display panel of claim 1, further comprising a planarizing layer disposed below the first transparent conductive layer.

3. The liquid crystal display panel of claim 1, further comprising a planarizing layer disposed above the second transparent conductive layer.

4. The liquid crystal display panel of claim 1, wherein a material of the dielectric layer comprises oxides, silicon oxides, silicon oxynitrides, or a combination thereof.

5. The liquid crystal display panel of claim 1, wherein a material of the dielectric layer comprises organic materials, inorganic materials, or a combination thereof.

6. The liquid crystal display panel of claim 1, wherein each of the first transparent conductive layer and the second transparent conductive layer comprises an indium tin oxide layer or an indium zinc oxide layer.

7. The liquid crystal display panel of claim 1, wherein the reflective layer is disposed on the second transparent conductive layer of the transistor region and areas adjacent to the transistor region.

8. The liquid crystal display panel of claim 1, wherein the first transparent conductive layer is electrically connected to a common electrode.

9. The liquid crystal display panel of claim 8, wherein a material of the common electrode comprises indium tin oxide, indium zinc oxide, or other metal material.

10. The liquid crystal display panel of claim 1, wherein the second transparent conductive layer includes a pixel electrode.

11. The liquid crystal display panel of claim 1, further comprising at least one thin film transistor disposed on the transistor region.

12. An array substrate for a liquid crystal display, comprising:
    a substrate having a plurality of pixel regions, each of the pixel regions comprises a transmitting region, a capacitor region, and a transistor region, each pixel region comprising:
    a thin film transistor disposed on the transistor region of the substrate;
    a first dielectric layer disposed on the substrate;
    a first patterned transparent conductive layer disposed on the first dielectric layer of the capacitor region;
    a second dielectric layer disposed on the first patterned transparent conductive layer and the substrate;
    a second patterned transparent conductive layer disposed on the second dielectric layer of the transistor region, the capacitor region, and the transmitting region and electrically connected to the thin film transistor; and
    a patterned reflective electrode disposed on a portion of the second patterned transparent conductive layer of the transistor region.

13. The array substrate for a liquid crystal display of claim 12, wherein a material of the first dielectric layer and the second dielectric layer comprises oxides, silicon oxides, silicon oxynitrides, or a combination thereof.

14. The array substrate for a liquid crystal display of claim 12, wherein a material of the first dielectric layer and the second dielectric layer comprises organic materials, inorganic materials, or a combination thereof.

15. The array substrate for a liquid crystal display of claim 12, wherein each of the first patterned transparent conductive layer and the second patterned transparent conductive layer comprises an indium tin oxide layer or an indium zinc oxide layer.

16. A liquid crystal display panel, comprising:
    a top substrate;
    a bottom substrate disposed opposite to the top substrate, wherein the bottom substrate comprises a transmitting region, a capacitor region, and a transistor region;
    a plurality of wires disposed on the bottom substrate;
    a liquid crystal layer disposed between the top substrate and the bottom substrate;
    a plurality of pixels electrically connected to the wires, each of the pixels comprising:
        a thin film transistor disposed on the transistor region of the substrate;
        a first dielectric layer disposed on the substrate;

a first patterned transparent conductive layer disposed on the first dielectric layer of the capacitor region;

a second dielectric layer disposed on the first patterned transparent conductive layer and the substrate;

a second patterned transparent conductive layer disposed on the second dielectric layer of the transistor region, the capacitor region, and the transmitting region and electrically connected to the thin film transistor, and a patterned reflective electrode disposed on a portion of the second patterned transparent conductive layer.

17. The liquid crystal display panel of claim 16, wherein a material of the first dielectric layer and the second dielectric layer comprise oxides, silicon oxides, silicon oxynitrides, or combination thereof.

18. The liquid crystal display panel of claim 16, wherein a material of the first dielectric layer and the second dielectric layer comprises organic materials, inorganic materials, or a combination thereof.

19. The liquid crystal display panel of claim 16, wherein each of the first patterned transparent conductive layer and the second patterned transparent conductive layer comprises an indium tin oxide layer or an indium zinc oxide layer.

20. The liquid crystal display panel of claim 16, further comprising a color filter disposed on the top substrate or the bottom substrate.

* * * * *